United States Patent
Constable

[15] 3,673,571
[45] June 27, 1972

[54] CREDIT-AND ACCESS-CONTROL EQUIPMENT

[72] Inventor: Geoffrey Ernest Patrick Constable, Cheltenham, England

[73] Assignee: Smith Industries Limited, London, England

[22] Filed: Nov. 19, 1970

[21] Appl. No.: 91,018

[30] Foreign Application Priority Data

Nov. 21, 1969 Great Britain......................57,005/69

[52] U.S. Cl. .....................................340/149 A, 235/61.7 B
[51] Int. Cl. .........................................................G06k 5/00
[58] Field of Search.............................340/149 A, 149, 152; 235/61.7 B

[56] References Cited

UNITED STATES PATENTS

| | | | |
|---|---|---|---|
| 3,564,210 | 2/1971 | Presti | 340/149 A X |
| 3,559,175 | 1/1971 | Pomeroy | 340/152 |
| 3,513,298 | 5/1970 | Riddle et al. | 340/149 X |
| 3,401,830 | 9/1968 | Mathews | 340/149 A UX |
| 3,038,157 | 6/1962 | Simjian | 235/61.7 B UX |

*Primary Examiner*—Donald J. Yusko
*Attorney*—William D. Hall, Elliott I. Pollock, Fred C. Philpitt, George Vande Sande, Charles F. Steininger and Robert R. Priddy

[57] ABSTRACT

A money-dispensing system is operative to dispense money in response to a bank-customer's magnetically-encoded credit card and keyed-entry of his personal-identification number only if this number accords with the customer's account number as read from an accounting record provided from the card. The record is printed out by a printing drum that is rotated in accordance with signals representing the account number read out from the card by a magnetic reading-head.

13 Claims, 4 Drawing Figures

Geoffrey Ernest Patrick Constable
Inventor by Hall, Pollock & Vande Sande
Attorneys

CREDIT-AND ACCESS-CONTROL EQUIPMENT

CROSS REFERENCE TO RELATED APPLICATION

This invention is concerned with modification of the invention described and claimed in my earlier U.S. Pat. application Ser. No. 851,186, filed Aug. 19, 1969.

BACKGROUND OF THE INVENTION

Application Ser. No. 851,186 is concerned with access- or transaction-control equipment in which authorization for access to a facility or credit for a transaction is obtained in dependence upon information borne by a credit card or other information-bearing token. A record of information borne by the card or token is made for accounting and auditing purposes, and it is from this, rather than from the card or token itself, that the information necessary for the authorization of access or credit is taken. By this means it is ensured that operation of the equipment is dependent upon successful recording of the information as well as upon the information itself.

The equipment described in detail in application Ser. No. 851,186 is a dispensing system that is for use by a banking firm to dispense money to authorized customers. Each customer authorized to use the system is issued with a credit card that is embossed with the customer's account number and other information in both bar-code and alpha-numeric form. The customer is separately informed of a secret personal-identification number individual to his account, and when he wishes to withdraw money he merely presents the embossed card to a terminal station of the system and keys in the personal-identification number. A printed record of the presented card required for accounting purposes, is made within the terminal station by inked-ribbon impression of the embossings, and authorization of the transaction is then requested from the bank's central computer. Authorization is given from the computer, so that dispensing can then take place to the customer at the terminal station, only if there is accord between the number keyed in and the customer's account number embossed on the card. The check for accord between the two numbers is carried out at the central computer and is based on a read out of the account number as taken from the impressed accounting-record. By taking the read-out of the account number from the record rather than from the embossed card itself, there is the security that authorization of the dispensing of money is not possible unless there already exists a record of the transaction satisfactory for subsequent accounting or checking purposes.

It is an object of the present invention to provide equipment that may be used to obtain the benefits of security applicable to the arrangement described in application Ser. No. 851,186, in circumstances in which the information that is required to be read out is not embossed on the credit card or other token used.

SUMMARY OF THE INVENTION

According to one aspect of the present invention equipment for use in control of a credit operation or access to a facility includes first means to receive an information-bearing token, and second means for providing a record of information borne by the received token. The second means comprises a reader for reading information from the token to supply signals in accordance therewith, and signal-operable means to provide said record in accordance with the signals supplied by the reader. The equipment further includes means for reading from the record part at least of the recorded information and means that is operable to signify authorization of the credit operation, or to enable access to said facility, in dependence upon the information read from the record provided by said signal-operable means.

The information may be recorded on the token magnetically, and in these circumstances the said reader may be a magnetic reading-head that is arranged to read the magnetically recorded information frOm each token received by said first means.

The said signal-operable meanS may be a printer that is arranged to be operated in accordance with the signals provided by the said reader to provide a print out of the information read from the token. Alternatively the said signal-operable means may be a punch that is similarly arranged to provide a punched record of the information. The equipment in this context may include means for storing record material in bulk, and may be arranged to respond to each occasion on which said first means receives an information-bearing token to feed a new, discrete element of the stored record material through the said signal-operable means to be imprinted or perforated as the case may be, in accordance with the information read from the received token.

The equipment of the present invention may be used at a point of sale for credit checking purposes; authorization for a requested credit tranSaction being signified in dependence upon the information read out from the record of the token-borne information. In this respect the equipment may be connected on-line to a central credit-checking processor, to transmit thereto the information read out from the record, and to receive back a signal indicating whether the transaction may or may not proceed. Furthermore, the equipment may be used to control access to any form of facility, for example, entry to a restricted area, use of a service, or release of means enabling withdrawal of an item or product (in predetermined or selected quantity). In the latter connection and according to a feature of the present invention, a dispensing system comprises entry means for receiving an information-bearing token presented to the system, token-reading means for reading information from the token and for providing signals in accordance therewith, recording means for providing a record of information borne by the token in accordance with the signals provided by said token-reading means, record-reading means for reading from said record part at least of the recorded information, manually operable means for entering a number into the system, the particular number entered being dependent upon manual selection, dispensing means that is selectively operable to provide a dispensing operation, and comparison means for comparing a number dependent upon the information read from said record with the number entered into the system, said comparison means including means for operating said dispensing means to perform said dispensing operation as aforesaid in dependence upon whether a predetermined correspondence exists between the compared numbers.

BRIEF DESCRIPTION OF THE DRAWINGS

A money-dispensing system in accordance with the present invention will now be described, by way of example, with reference to the accompanying drawings, in which.

DESCRIPTION OF THE PREFERRED EMBODIMENTS

Figure 1:
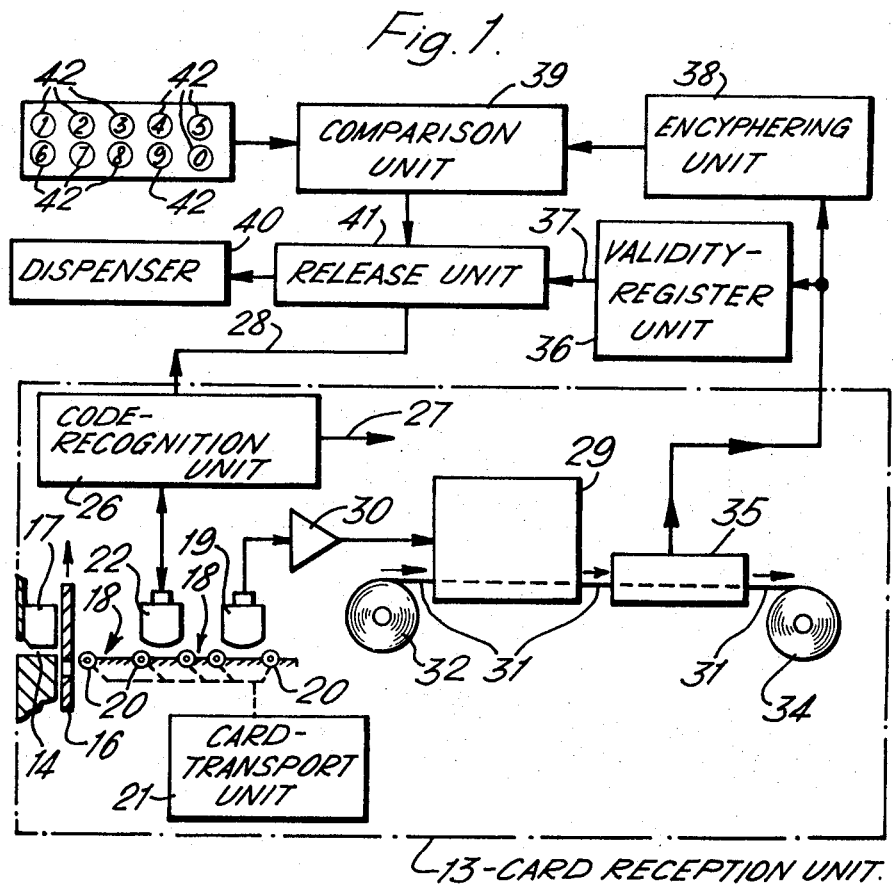
FIG. 1 is a schematic representation of the dispensing system.
Figure 2:
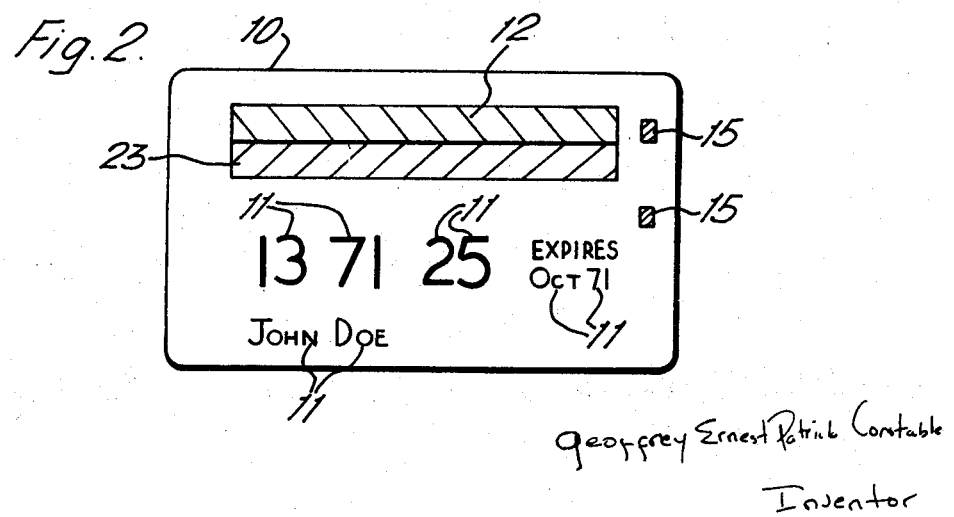
FIG. 2 shows the form of an information-bearing token used with the system of FIG. 1.

The money-dispensing system represented in FIG. 1 is for installation at a bank to be operable to dispense packets of bank-notes, one at a time to authorized customers of the bank after, as well as during, normal banking hours. The customers authorized to use the system are each issued with an information-bearing token in the form of the rectangular plastics card 10 that may be used generally as a credit card. Each card, as shown in FIG. 2, bears the date of expiry and numerical information identifying the account of the customer to whom the card has been issued. This information, as well as being embossed or printed on the card in alpha-numeric characters 11, is recorded magnetically in a decimal-coded form in a ferromagnetic track 12 running lengthwise of the card 10.

Each customer is informed of a secret, personal-identification number that is individual to his account but cannot be deduced from the card 10 itself, and of a maximum, permissible rate of use of the card to withdraw packets of bank-notes. For the purposes of the present description it will be assumed that the maximum rate of withdrawal is once in any day.

When the customer wishes to withdraw a packet of bank-notes he presents his card 10 to a card-reception unit 13 of the system. The unit 13 has a facia that is mounted in an external wall of the bank to be accessible from outside and provide an entrance 14 for the card 10. The card 10, which as shown in FIG. 2 carries dark markings 15 at one end, is inserted in the entrance 14 lengthwise with the magnetic track 12 uppermost and with the markings 15 just within the unit 13. Entry of the card 10 further is blocked by an apertured shutter 16 until the existence, with appropriate location on the card 10, of the markings 15 is detected by a photoelectric detecting arrangement 17. Detection of the appropriately located markings 15 causes the shutter 16 to be lifted to admit the card 10 fully to the unit 13 through the entrance 14.

The card 10 admitted fully to the unit 13 is drawn lengthwise along a guideway 18 to a magnetic reading head 19 by rollers 20 that are driven by a card-transport unit 21. In its passage along the guideway 18 to the head 19 the card 10 passes beneath a magnetic reading recording head 22 which reads out pulse recordings from a ferromagnetic track 23 that, as indicated in FIG. 2, runs parallel to track 12 on the card 10. The recorded pulses are coded to signify the date on which the card 10 was last used, and the recording of them in track 23 is made usinG a head having a recording gap of a V-shape configuration. The recording in track 23 is characterized by a corresponding V-shape pattern of magnetization and it is only by using the same head, of one having the same V-shape configuration of gap, that the recorded withdrawal-rate information can be read intelligibly from the card 10. The head 22 (as distinct from the head 19) has a reading-recording gap of this specific V-shape configuration, and in conjunction with a code-recognition unit 26 carries out two checks on the card 10. The first of these is a check on the authenticity of the request for money, to the extent that the unit 26 detects that the level of the signals read out from the track 23 exceeds a predetermined threshold level. The check is satisfied and a signal is as a result supplied on a lead 27, only if the recording in the track 23 has the characteristic V-shape pattern of magnetization referred to above.

In the second security check the unit 26 determines from the withdrawal-rate information read for track 23 whether the dispensing of money to the customer would cause him to exceed the maximum permissible withdrawal rate. To this end the signals supplied by the head 22 are decoded in the unit 26 to determine whether the date they represent is prior to the current date. If it is, and the once-in-a-day rate would accordingly not be exceeded, an output signal indicative of this fact supplied from the unit 26 to a lead 28. The supply of this signal to the lead 28, which as described later is a prerequisite for the dispensing of money to the customer, is inhibited in the event that no signal is supplied to the lead 27. Thus the signal appears on the lead 28 after passage of the received card 10 beneath the head 22, only in the event that both checks carried out in the unit 26 are satisfied.

Figure 3:
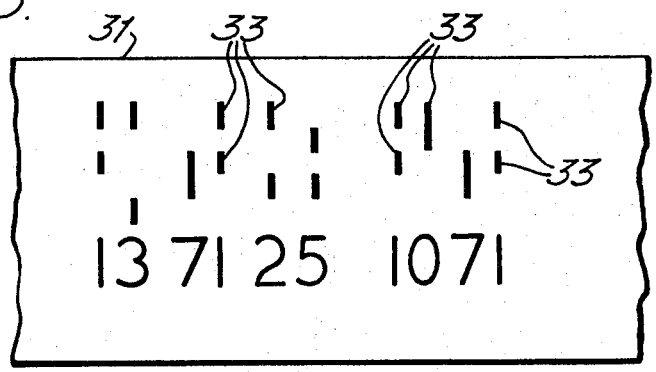
FIG. 3 shows the form of a printed record that is made by a printer unit of the system of FIG. 1 in accordance with information read from the token of FIG. 2.

From the head 22 the card 10 is driven on to pass beneath the magnetic reading head 19. The head 19 reads the decimal-encoded information, namely the account number and expiry date, recorded in track 12, and passes signals in accordance with this to a printing unit 29 via an amplifier 30. The unit 29 prints out this information on a paper tape 31 that is fed from a supply spool 32, the print out being in decimal characters and also, as shown in FIG. 3, according to a two-out-of-five decimal code using bar-characters 33. The tape 31 imprinted in this way passes out from the printing unit 29 to a take-up spool 34 via a photoelectric reader 35.

The photoelectric reader 35 reads from the tape 31 the imprint of the bar-characters 33 and supplies signals in accordance with the encoded expiry date and account number to a validity-register unit 36. The expiry date and account number are here checked to ascertain whether the card 10 is still in force and not otherwise invalid; in the latter respect the unit 36 checks the account number against the account numbers of customer's cards that are no longer valid by virtue of having been reported as lost or stolen. If the result is satisfactory on both counts, then a signal indicative of this is supplied from the unit 36 to a lead 37.

The signals representative of the account number read out from the tape 31 are also supplied from reader 35 to an encyphering unit 38 which acts according to an involved and secret program to derive from this number the corresponding personal-identification number. Signals in accordance with the personal-identification number derived in this way are conveyed to a comparison unit 39 that controls release of a bank-note dispenser 40 via a release unit 41.

The customer is now instructed by illumination of a sign (not shown) on the facia of the unit 13 to enter his personal-identification number into the system. The number, preferably of six digits, is entered using a set of ten push-buttons 42 mounted on the facia of the unit 13 and numbered 0 to 9. As the push-buttons 42 are operated one at a time to enter the digits sequentially, their values are conveyed to the comparison unit 39. In the unit 39 the manually entered number is compared digit-by-digit with the number derived from the account number in the encyphering unit 38. If there is correspondence between them and the appropriate signals are present on the leads 28 and 37 to signify that the checks as to authenticity, withdrawal-rate and validity carried out in the units 26 and 36 are all satisfied, then the unit 41 releases the dispenser 40 to dispense a single packet of bank-notes to the customer through a delivery-slot (not shown) in the facia of the unit 13. One dispensing has taken place the card transport unit 21 drives the rollers 20 to transport the card 10 back beneath the heads 19 and 22 for return to the customer through the entrance 14. The head 22 is appropriately energized from the unit 26 during this to record the current date (in the pulse-encoded and characteristic form) in the strip 23 of the card 10, and thereby up-date the withdrawal-rate information on the card.

The unit 41 does not release the disPenser 40, and no dispensing therefore takes place, in the event that the numbers compared by the unit 39 do not correspond, or any of the three checks on authenticity, withdrawal-rate and validity carried out by the units 26 and 36, are not satisfied. In the circumstances in which there is no correspondence between the compared numbers, or the check on withdrawal rate is not satisfied, the card 10 is returned but without any up-dating of the withdrawal-rate information in this case. The card 10 is however driven from the imprinter 19 to be retained in a safe bin (not shown) within the system, in the event that either of the authenticity-and validity-checks is not satisfied; the criterion for retention and the operation of the unit 21 to this end, is absence of a signal from either of the two leads 27 and 37. In all cases where there is no dispensing, the imprinted tape 31 is stamped (by means not shown) to indicate this.

The tape 31 imprinted with the information from the card 10 and retained within the system on the spool 34, provides a record of the transaction, whether successful or not, for the necessary accounting and checking purposes. The main basis for the dispensing operation is the information, in particular the account number, encoded on the card 10, and the fact that this is read from the tape 31 as imprinted by the printer unit 29, rather than from the card 10 itself, is of substantial advantage. In particular it ensures that the dispensing operation is conditional upon there being an accurate and legible record of the transaction.

Figure 4:
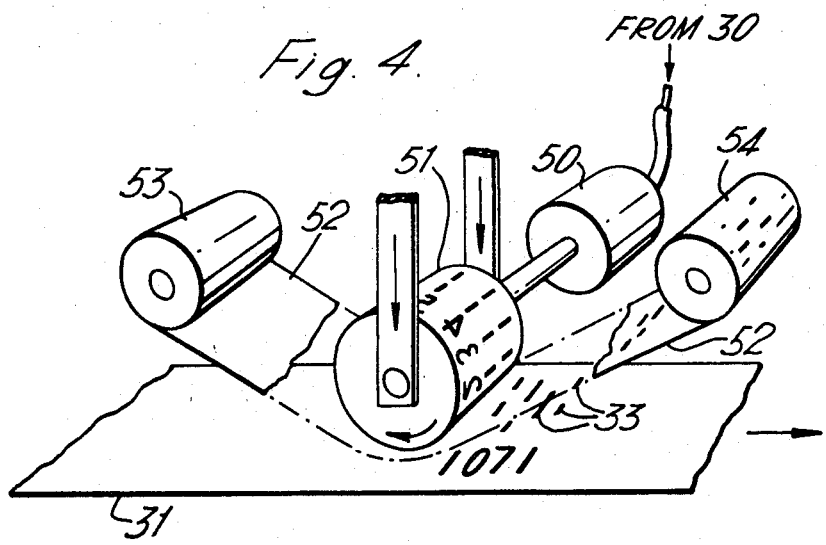
FIG. 4 serves to illustrate one possible constructional form of the printer unit of the system of FIG. 1.

The printer unit 29 may have any of a variety of forms, and in particular may have the form indicated schematically in FIG. 4.

Referring to FIG. 4, the signals supplied from the amplifier 30 are applied in the printer unit to a stepping motor 50 that drives a printing drum 51. The drum 51 is embossed around its circumference with the decimal digits 0 to 9 and also in each case with the two-out-of-five bar coding appropriate to the digit. As the signals representative of each decimal digit of the account number an expiry date are received from the amplifier 30, so the motor 50 rotates the drum 51 to bring the appropriate embossed decimal-character to face downwardly onto a carbon ribbon 52. The ribbon 52 is fed from a supply spool 53 to pass between the drum 51 and the paper tape 31, and as the appropriate embossings are brought in turn to face downwardly onto the ribbon 52, so the drum 51 is depressed. This squeezes the ribbon 52 against the tape 31 and thereby imprints the tape 31 with the relevant decimal- and bar-characters. The tape 31 is advanced in steps as the successive digits of the account number and expiry date are imprinted, and this advance is continued until the whole of the imprinted length of tape 31 has been passed through the photoelectric reader 35.

The carbon ribbon 52, which is advanced with the tape 31 during the imprinting operation, is of the 'total transfer' kind, the carbon ink transferred to the tape 31 leaving tranSparent windows in the used length from which the information as to account number and expiry date can be easily read. The used length of the ribbon 52, as stored on a take-up spool 54, accordingly provides a useful means of checking the record provided by the imprinted tape 31.

A form of photoelectric reader that is suitable for use as the reader 35 (and also as the photoelectric reading arrangement 17) is described in Holter co-pending U.S. Pat. application No. 88015 filed Nov. 9, 1970, and assigned to the assignee of the instant application. Details of the construction and use of the magnetic security head 22 and of the encyphering unit 38, are contained respectively in my co-pending U.S. Pat. application Nos. 66181 and 66182 both filed Aug. 24, 1970. Furthermore, my aforementioned U.S. application No. 851186 and issued U.S. Pat. NO. 3,611,293 and 3,629,834, each describe a form of money-dispensing system that involves on-line communication between each of a number of money-dispensing terminals and a central station that serves to check and update the account-status of each customer making a request for withdrawal of money; although the system described in the present specification is not of this form, the invention is nonetheless just as applicable to on-line systems.

Although with the specific system described with reference to FIG. 1, the information as to account number and expiry date is carried as magnetic recording on the card 10, this is not an essential of the invention. The information could equally well, for example, be carried in the form of punched holes, and in this case it would simply be necessary to replace the magnetic head 19 by a hole sensor capable of applying the appropriate signals to the printer unit 29. Alternatively, these signals could be provided by a character-reader that reads the information as printed or embossed on the card 10 in the alpha-numeric characters 11.

I claim:

1. In equipment for use in control of a credit operation of the type comprising first means to receive an information-bearing token, second means to provide a discrete record of information borne by the received token, third means for reading from the record part at least of the recorded information, and fourth means operable to signify authorization of said operation in dependence upon the information read from said record whereby authorization of said operation is dependent upon the existence of a readable record in accordance with the token-borne information: the improvement wherein said second means comprises a reader for reading information from the token and operative to supply signals in accordance therewith, material capable of receiving data recordings for credit-accounting purposes, signal-operable means to record data in accordance with the signals supplied by said reader on a discrete element of said material so as to provide thereby said record of the token-borne information, and means for presenting a fresh element of said material to said signal-operable means for data recording in respect of each successive occasiOn on which a token is received by said first means so that the successive elements of said material provide individual loggings of data in respect of the successive operations of the equipment.

2. Equipment according to claim 1 wherein said reader comprising means for reading information recorded magnetically on the token.

3. In equipment for use in control of a credit operation of the type comprising card-receiving means for receiving an information-bearing credit card, recording means operative to provide a hard-copy record of information borne by the credit card for accounting purposes, reading means for providing a read out of at least part of said card-borne information, and credit authorization means operable to signify authorization of said credit operation in dependence upon the card-borne information read out by said reading means: the improvement wherein said recording means comprises a reader for reading information from the token and including means operative to provide signals in accordance therewith, said recording means further comprising an imprinter responsive to said signals for imprinting record material in accordance with said signals to provide said hard-copy record, and said reading means comprising means for providing said read out from the hard-copy record provided by said imprinting means, whereby authorization of said credit operation is conditional upon the making of a readable hard-copy account record dependent upon said card-borne information.

4. Access-control equipment for selectively enabling access to a facility in response to a request made by a person presenting an information-bearing token to said equipment, comprising first means for receiving within the equipment the information-bearing token presented thereto, second means for providing from the received token a discrete record of information borne thereby, said second means comprising a reader for reading the information from the token to provide signals in accordance therewith, elements of a data-recording medium, and signal-operable means to provide said record in accordance with said signals on one of said elements, third means for reading from said one element part at least of the information recorded thereon by said signal-operable means, and fourth means operable in dependence upon the information read from said record to enable said person access to said facility whereby access to said facility is conditional upon the making of a readable record of said token information, said second means including means operative to present successive ones of said elements to said signal-operable means in respect of successive requests for access so that the record-retaining elements provide a logging of the token-borne data in respect of those individual requests for access.

5. Access-control equipment according to claim 4 wherein said reader is a magnetic reading-head.

6. Access-control equipment according to claim 4 wherein said signal-operable means is means to provide a printed record in accordance with said signals.

7. Access-control equipment according to claim 6 wherein said third means is photoelectric-reader means for deriving electric signals in accordance with the said printed-record, and said fourth means includes means for supplying an electric control signal selectively in dependence upon the signals derived by said photoelectric-reader means, and means responsive to the supply of said control signal to enable access to said facility.

8. Access-control equipment for selectively enabling access to a facility, comprising first means for receiving an information-bearing token presented to the equipment, second means for providing from the received token a record of information borne thereby, said second means including a reader for reading the information from the token to provide signals in accordance therewith, and signal-operable printer means to provide a printed record in accordance with said signals, third means for reading from said printed record part at least of the recorded information, and fourth means that is operable in dependence upon the information read from said printed record to enable access to said facility, said second means further including means for storing in bulk record material capable of receiving and retaining print, and feed means responsive to each occasion on which said first means receives an information-bearing token to feed a discrete element of the stored record material through said printer means to receive said printed record in respect of that token, said feed means being operative to feed successive elements of the stored record material through said printer means on successive occasions of token-reception so as to provide discrete printed records in respect of those occasionS.

9. Access-control equipment according to claim 8 wherein said record material is paper tape.

10. Access-control equipment according to claim 4 including manually operable meanS for enterinG into the equipment a plural character word, the particular word entered being dependent upon manual selection, comparison means for detecting whether a predetermined correspondence exists between the information read from said record and the manually entered word, and meanS for operating said fourth means to enable access to said facility only in the event that said predetermined correspondence exists.

11. Access-control equipment according to claim 4 in combination with a dispenser for performing a dispensing operation in response to each operation of said fourth means.

12. A dispensing system for dispensing items in response only to the concurrence of a number of conditions one of which is the prior making of a readable logging record of information appearing on an information-bearing token, comprising dispensing means that is selectively operable to perform a dispensing operation, entry means for receiving an information-bearing token presented to the system as part of a request for operation of said dispensing means, token-reading means for reading information from the token and for providing signals in accordance therewith, elements of a data-recording medium, recording means for providing on one of said elements a record of information borne by the token in accordance with the signals provided by said token-reading means so as thereby to log said information, record-reading means operative in response to the making of a readable log-record of said information for reading from said one element at least part of the recorded information, manually-operable means for entering a number into the system as a further part of said request, and comparison for comparing a number dependent upon the information read from said one element with the number entered into the system, said comparison means including means for operating said dispensing means to perform said dispensing operation as aforesaid in dependence upon whether a predetermined correspondence exists between the compared numbers, said system further including means to present successive ones of said elements to said recording means in respect of successive requests for operation of said dispensing means so that the record-retaining elements provide account logging of information in respect of the successive requests.

13. An item-dispensing system according to claim 12 wherein said recording means is means to provide a printed record in accordance with said signals.

* * * * *